United States Patent [19]

Santangelo et al.

[11] Patent Number: 4,665,136
[45] Date of Patent: May 12, 1987

[54] PROCESS FOR PRODUCING NOVEL BLOCK ALKYLENE POLYCARBONATE COPOLYMERS

[75] Inventors: Joseph G. Santangelo; James J. Weber, both of Allentown, Pa.; Richard G. Sinclair, Columbus, Ohio

[73] Assignee: Air Products and Chemicals, Inc., Allentown, Pa.

[21] Appl. No.: 848,890

[22] Filed: Apr. 7, 1986

[51] Int. Cl.$^4$ .............................. C08G 63/62
[52] U.S. Cl. ................................... 525/523
[58] Field of Search ......................... 525/523

[56] References Cited

U.S. PATENT DOCUMENTS

| | | | |
|---|---|---|---|
| 3,248,415 | 4/1966 | Stevens | 260/463 |
| 3,585,168 | 6/1971 | Inoue et al. | 260/77.5 D |
| 3,639,503 | 2/1972 | Matzner | 525/413 |
| 3,900,424 | 8/1975 | Inoue et al. | 252/428 |
| 3,953,383 | 4/1976 | Inoue et al. | 260/2 BP |
| 4,072,704 | 2/1978 | Langdon | 528/230 |
| 4,079,038 | 3/1978 | Choi et al. | 528/206 |
| 4,303,759 | 12/1981 | Dixon et al. | 525/408 |
| 4,430,485 | 2/1984 | Mark | 528/174 |
| 4,430,492 | 2/1984 | Schreckenberg et al. | 528/174 |
| 4,607,070 | 8/1986 | Schreckenberg et al. | 525/523 |

OTHER PUBLICATIONS

Raymond B. Seymour, Introduction to Polymer Chemistry, 1971, p. 204.
Fred W. Billmeyer, Jr., Textbook of Polymer Science, second edition, 1971, p. 351.

Primary Examiner—Herbert J. Lilling
Attorney, Agent, or Firm—Mark L. Rodgers; E. Eugene Innis; James C. Simmons

[57] ABSTRACT

The present invention is a novel class of block copolymers and a process of making the same. An alkylene oxide is reacted with $CO_2$ in an organic solvent in the presence of an organometallic catalyst to form a polyalkylene carbonate. A second alkylene oxide is subsequently added without the addition of catalyst. The resulting product is a block copolymer comprising distinct, covalently linked, alkylene carbonate blocks.

25 Claims, No Drawings

PROCESS FOR PRODUCING NOVEL BLOCK ALKYLENE POLYCARBONATE COPOLYMERS

TECHNICAL FIELD OF THE INVENTION

The present invention relates to the production of block copolymers comprising covalently linked alkylene carbonate blocks.

BACKGROUND OF THE INVENTION

Inoue, U.S. Pat. No. 3,585,168 teaches a process for producing a high molecular weight polycarbonate by copolymerizing an epoxide, such as propylene oxide, ethylene oxide, styrene oxide, isobutylene oxide or epichlorohydrin with carbon dioxide. The process is carried out under carbon dioxide gas pressure in the presence of an organometallic compound catalyst. The polycarbonates formed by this process are made of substantially the same mole ratio of carbon dioxide and epoxide and have a molecular weight between 10,000 and 200,000.

U.S. Pat. No. 3,900,424 discloses a catalyst composition, and method of preparing said composition, for use in preparing copolymers of epoxy compounds with carbon dioxide. The catalyst composition comprises the reaction product of an organometallic compound, a co-catalyst component which is sulfur or a compound containing active hydrogen atoms and carbon dioxide.

U.S. Pat. No. 3,953,383 teaches a process for producing a copolymer of an epoxy compound with carbon dioxide by carrying out the polymerization reaction in the presence of a catalyst composition as described in U.S. Pat. No. 3,900,424. The copolymerization is carried out at a temperature within the range of from about 0° C. to about 150° C.

U.S. Pat. No. 3,248,415 discloses a process for copolymerizing carbon dioxide and a 1,2 epoxide, such as ethylene oxide, to yield polycarbonates of 700 to 5,000 molecular weight. The process is carried out in the presence of a small controlled concentration of an organic compound having at least 2, usually 2 to 4, active hydrogens such as a polyhydric alcohol at elevated temperature, superatmospheric pressure and preferably under conditions of base catalyst.

In *Introduction to Polymer Chemistry* by Raymond B. Seymour, (1971) at page 204 it is disclosed that "homopolymers with reactive end groups may be converted to block copolymers by reactions with the active end groups, such as hydroxyl, carboxyl, and amine groups. poly (ethylene oxides) with hydroxyl terminal groups may react with propylene oxide to product chains with different blocks of alkylene oxides."

In *Textbook of polymer Science* by Fred W. Billmeyer, Jr. at page 351, it is taught that block copolymers can be synthesized by producing "living" polymers by unterminated anionic polymerization. A second monomer can be added to the still active polymer, leading to a block copolymer uncontaminated with homopolymer and having blocks of accurately known and controlled length.

BRIEF SUMMARY OF THE INVENTION

The present invention is a novel class of block copolymers and a process for producing the same. The block copolymers have at least two distinct, covalently linked alkylene carbonate blocks, and have the structural formula:

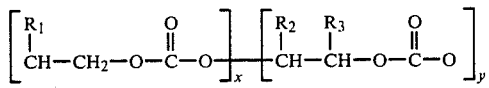

wherein $R_1$ is H, $CH_3$, $C_2H_5$, or $C_6H_5$; $R_2$ and $R_3$ are independently H, $CH_3$, $C_2H_5$ or $R_2$ and $R_3$ together form a six member ring; and x and y are both integers from 50 to 10,000.

The process for producing block copolymers as described above comprises initially copolymerizing an alkylene oxide with carbon dioxide to form the corresponding polyalkylene carbonate. The process is carried out in a reaction vessel containing an organic solvent and in the presence of an organometallic catalyst. After the copolymerization reaches completion or equilibrium, a second alkylene oxide is added to the reaction vessel. The addition of the second alkylene oxide can take place without the addition of catalyst although additional catalyst may be added if desired. The second alkylene oxide reacts with the polyalkylene carbonate to form the block copolymer.

DETAILED DESCRIPTION OF THE INVENTION

A novel class of block copolymers are synthesized by initially reacting an alkylene oxide with $CO_2$ in an organic solvent in the presence of an organometallic catalyst to form a polyalkylene carbonate. The polyalkylene carbonate is subsequently reacted with a second alkylene oxide to form a block copolymer comprising distinct, covalently linked, alkylene carbonate blocks.

The block copolymers of the present invention have the general structural formula:

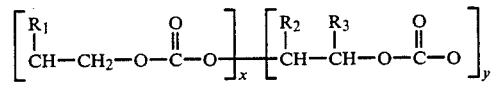

wherein $R_1$ is H, $CH_3$, $C_2H_5$ or $C_6H_5$; $R_2$ and $R_3$ are independently H, $CH_3$, $C_2H_5$ or $R_2$ and $R_3$ together form a six member ring; and x and y are both integers from 50 to 10,000. The block copolymer has a molecular weight between about 5,000 and 2 million with a range between 20,000 and 100,000 weight average being preferred.

Initially, an alkylene oxide is reacted with $CO_2$ to form the corresponding polyalkylene carbonate. The alkylene oxide can be any compound which will polymerize with $CO_2$, and preferably are selected from the class of 1,2 epoxides. Specific examples of suitable alkylene oxides are described by S. Inoue and N. Yamazaki in *Organic and Bio-organic Chemistry of Carbon Dioxide* (1982) p. 173, Table 4.15 and include ethylene oxide, propylene oxide, butylene oxide, isobutylene oxide, cyclohexyl oxide, etc. The alkylene oxide is contacted with an organometallic catalyst in a suitable reaction vessel. The reaction vessel preferably contains an organic solvent capable of dissolving the alkylene oxide; e.g. dioxane, and the catalyst, and also preferably contains an organic diluent such as toluene.

The reaction vessel is then pressurized to between 5 and 50 kg/cm² with carbon dioxide and the reaction is allowed to proceed to equilibrium or completion. The carbon dioxide is preferably added in excess, i.e. a $CO_2$ to alkylene oxide ratio of between 3:1 to 10:1. The reaction is carried out at a temperature between 0° and 150° C.

The catalyst employed can be any suitable organometallic catalyst which is capable of catalyzing the reaction. Generally the organometallic catalyst has the structural formula: $R'_n M$ wherein n is an integer, at least one R' is an alkyl group, an alicyclic group or halogen or hydroxy or alkoxy radicals, or hydrogen; the remaining R' groups are alkyl groups, alicyclic groups, alkaryl groups, aralkyl group, acyl groups or halogen or hydroxy or alkoxy radicals, and M is a metal of Group I, II or III of the Periodic Table. Specific examples of suitable metal elements include zinc, aluminum, lithium, calcium, magnesium and cadmium, although other metal elements may be equally suitable.

The catalyst may also contain a co-catalyst component such as sulfur or a compound containing active hydrogen atoms;, e.g. water. In some instances, the catalyst/co-catalyst system may be reacted with $CO_2$ prior to being used to catalyze the polymerization. The catalyst should typically be present in a catalytic amount of from between 0.01 to 10 mole percent.

After the initial polymerization between the alkylene oxide and the carbon dioxide is completed or has reached equilbrium, a second alkylene oxide is added to the reaction vessel. The second alkylene oxide may be added with additional $CO_2$ if necessary, but additional catalyst does not have to be added. Careful steps must be taken to insure that water or other chain terminating compounds are excluded from the reaction vessel. The second alkylene oxide reacts with the carbon dioxide in the reaction vessel to form a second polyalkylene carbonate which covalently bonds to the first polyalkylene carbonate present in the reaction vessel to form the desired block copolymer. The addition of the second alkylene oxide can take place shortly after the addition of $CO_2$ with the first alkylene oxide, or can be delayed for a significant time thereafter; e.g. in some instances addition of the second alkylene oxide more than 90 hours after initiation of the first reaction resulted in block copolymer product.

The fact that the addition of the second alkylene oxide can be delayed for a significant period of time indicates, at least theoretically, that the initial reaction does not undergo a termination step, thus allowing the second alkylene oxide to react with $CO_2$ and block onto the previously formed polyalkylene carbonate. Additionally, the fact that additional catalyst does not have to be added with the second alkylene oxide further supports the theory that the reaction is still "alive" and is not reinitiated by the addition of more catalyst. Also, the method of reactant addition and product analysis indicates that the block copolymer is formed by covalent step-wise addition, and is not a graft copolymer.

The block copolymer produced comprises at least two, distinct, covalently-linked polyalkylene carbonate blocks. The initial polycarbonate block is generally a "pure" block comprised of $CO_2$ and the first alkylene oxide monomers. The subsequent blocks can also be "pure" blocks or alternatively can be "mixed" blocks comprising $CO_2$ and monomer units of both the first and subsequent alkylene oxide monomers. This is especially true if the initial polymerization does not proceed to completion and there is unreacted alkylene oxide present when the second alkylene oxide is added. In such instances the product comprises a "pure" block covalently linked to a "mixed" block.

The present process allows for the production of block copolymers having a wide range of properties. The properties can be tailored according to desired end product use by selecting both the type and quantity of alkylene oxide monomers for the polymerization process. For example, the properties of polyethylene carbonate can be altered slightly by blocking on a small amount of polypropylene carbonate. Alternatively, a block copolymer can be synthesized which has unique properties, significantly different from the individual polycarbonates, such as one having both thermoplastic and elastomeric properties. A block copolymer of polyethylene carbonate and polycyclohexyl carbonate is one example of such a copolymer.

Several examples were carried out in accordance with the present invention and are set out below. These examples are presented to illustrate the invention and are not meant to be limiting.

EXAMPLE 1

A clean dry 5-gallon autoclave was charged 4 kg of p-dioxane, 174 g of diethylzinc, 200 ml of toluene, and 26 g of $Al_2(SO_4)_3 \cdot 18H_2O$. This was pressurized to 450 psi with carbon dioxide and heated at 264° F. with stirring for 24 hours. The reactor was cooled and vented and 1583 g of propylene oxide and 800 ml of toluene added. The reactor and its contents were pressurized to 600 psi and heated 48 hours at 122° F. with stirring, then 1100 psi for four hours at 122° F. A 1530 g quantity of ethylene oxide was added and heating and stirring continued another four hours. The products were isolated by washing with 10% HCl, then with water until neutral, and precipitating in 3-fold excess of methanol. After drying, the clear, tough polymeric products weighed 1858 g and were characterized as follows:

Weight—Average molecular weight, GPC—200,000

Solubility—Soluble in chloroform and methylene chloride; insoluble in tetrahydrofuran, methanol and acetone.

Infrared Spectrum—Strong absorption at 1750 and 1210 $cm^{-1}$, absorption at 1450, 1380, 1060, 1040, 970, 850 and 780 $cm^{-1}$.

NMR—Singlet at delta 4.36, and multiplets at delta 1.32, 4.21 and 4.99.

Thermochanical Analysis—Inflection point and glass transition temperature at 27° C.

Tensile Strength—The tensile strength of the specimens averages 1000 psi.

By way of contrast, the copolymer of propylene oxide and carbon dioxide; i.e. polypropylene carbonate (PPC), is soluble in tetrahydrofuran, does not show an infrared absorption at 1040 $cm^{-1}$, shows NMR resonances at deltas 1.32, 4.21 and 4.99, has a glass transition temperature of 27°–32° C., and has a tensile strength of 3000–4000 psi. Polyethylene carbonate (PEC), by itself is not soluble in tetrahydrofuran, has no infrared absorption at 1060 and 970 $cm^{-1}$, has a glass transition temperature of 7°–17° C., a tensile strength of 100–1500 psi, and an NMR singlet at delta 4.35. Additionally, the polymeric product exhibited elastic recovery from up to a six-fold elongation.

The polymer product was a block copolymer comprising a "pure" polypropylene carbonate block covalently linked to a second block containing polyethylene carbonate. The polyethylene carbonate block was either a "pure" block or a mixed block of predominantly polyethylene carbonate with minor amounts of propylene carbonate. The weaker polyethylene carbonate linkages dominate the tensile strength and limit solubility in tetrahydrofuran, whereas the infrared, glass transition temperature, and NMR analyses reflect that of polypropylene carbonate structure.

EXAMPLE 2

1530 g of propylene oxide was copolymerized with carbon dioxide using 174 g of diethyl zinc. The reaction was carried out in the presence of dioxane solvent. Visual examination of the products revealed a very thick paste at the end of 48 hours of reaction. The reactor was repressurized at 1100 psi with carbon dioxide and the reaction continued at 50° C. for an additional four hours. Subsequently, 1538 g of ethylene oxide was added to the reaction vessel. After approximately two hours the reaction exothermed badly, reaching 132° C. before venting of pressure cooled the reactor. Evidently carbon dioxide was consumed rapidly, the pressure being only 400 psi at 132° C. At the end of the second monomer addition the percent solids was close to theoretical (46 percent vs 51 percent).

The product was collected and purified in much the same manner as described in Example 1. The IR spectrum was that of PPC, although the spectrum of PPC has all the features of PEC, plus some. The glass transition temperature, Tg, was that of PPC. The solubility, density and tensile strength, however, was that of PEC. An NMR analysis revealed about an 1:1.8 ratio of PEC:PPC.

Based upon the above characterization data and the exotherm during the reaction, it can be concluded that the recovered product was a block copolymer of polyethylene carbonate and polypropylene carbonate. Since no additional catalyst was added along with the second monomer, the initial catalyst remained active at the end of the first copolymerization. The weight average molecular weight of the product was about 207,000.

EXAMPLE 3

A block copolymer of cyclohexyl carbonate and ethylene carbonate was prepared in accordance with the general procedures set out in Example 1 above. Polycyclohexyl carbonate (PCHC) was prepared first by copolymerization of cyclohexene oxide and carbon dioxide. After approximately 90 hours, the product was sampled. The PCHC was isolated by methanol precipitation and dried to obtain a clear, brittle film-forming material, consistent with the reported Tg of 130° C. for PCHC.

Ethylene oxide and carbon dioxide were subsequently added to the reactor and the copolymerization continued. After approximately a nineteen hour reaction period, the product was isolated by methanol precipitation, and compared to the PCHC recovered above. PGHC is soluble in chloroform, methylene chloride, p-dioxane, tetrahydrofuran, toluene and methylethyl ketone. The product was soluble only in p-dioxane, methylene chloride and chloroform.

NMR spectrum results for the product showed resonance at delta 4.36, attributable to PEC, and delta 1.54, attributable to PCHC. The ratio of PEC:PCHC was about 40:60.

The above results indicate that the product was a copolymer of a polycyclohexyl carbonate block and a second block containing polyethylene carbonate. Additional blocks could be added to form a block copolymer having the properties expected of a thermoplastic elastomer.

Having thus described the present invention, what is now deemed appropriate for Letters Patent is set out in the following appended claims.

What is claimed:

1. A process for producing a block copolymer having at least two distinct, covalently linked alkylene carbonate blocks and having the structural formula:

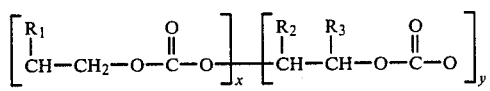

wherein $R_1$ is H, $CH_3$, $C_2H_5$, or $C_6H_5$; $R_2$ and $R_3$ are independently H, $CH_3$, $C_2H_5$ or $R_2$ and $R_3$ together form a six member ring; and x and y are both integers from 50 to 10,000 said process comprising:
   (a) copolymerizing an alkylene oxide with excess carbon dioxide in a reaction vessel in the presence of an organometallic catalyst until said polymerization reaches equilibrium; and
   (b) subsequently adding a second alkylene oxide to the reaction vessel to form said block copolymer.

2. The process in accordance with claim 1 wherein the second alkylene oxide is added to the reaction vessel without the addition of additional catalyst.

3. The process in accordance with claim 1, wherein additional carbon dioxide is added to the reaction vessel along with the second alkylene oxide.

4. The process in accordance with claim 1, wherein said process is carried out at a temperature between about 0° C. to 150° C.

5. The process in accordance with claim 1, wherein said process is carried out at a pressure between about 5 and 50 kg/cm².

6. The process in accordance with claim 1 wherein the alkylene oxides are selected from the group consisting of ethylene oxide, propylene oxide, isobutylene oxide and cyclohexyl oxide.

7. The process in accordance with claim 1, wherein the organometallic catalyst having the general formula R'n M wherein n is an integer, at least one R' is an alkyl group, an alicyclic group or halogen or hydroxy or alkoxy radicals, or hydrogen, the remaining R' groups are alkyl groups, alicyclic groups, alkaryl groups, aralkyl groups, aryl groups or halogen or hydroxy or alkoxy radicals, and M is a metal of Group I, II or III of the Periodic Table.

8. The process in accordance with claim 7 wherein said catalyst is diethyl zinc.

9. The process in accordance with claim 7 wherein said catalyst also comprises a co-catalyst component which is sulfur or a compound containing active hydrogen atoms.

10. The process in accordance with claim 9 wherein said catalyst and co-catalyst are also reacted with $CO_2$ prior to being used to catalyze the copolymerization.

11. The process in accordance with claim 1 wherein the carbon dioxide to alkylene oxide ratio is between 3:1 to 10:1.

12. The process in accordance with claim 1 wherein said organometallic catalyst is present in a catalytic amount of from between 0.01 to 10 mole percent.

13. The process in accordance with claim 1 wherein said block copolymer has a molecular weight between 5,000 and 1,000,000.

14. The process in accordance with claim 1 wherein said process is carried out in the presence of an organic solvent.

15. The process in accordance with claim 14 wherein said organic solvent comprises dioxane.

16. The process in accordance with claim 14 wherein an organic diluent is added to the organic solvent.

17. The process in accordance with claim 16 wherein said organic diluent is toluene.

18. A block copolymer having at least two distinct covalently linked alkylene carbonate blocks, and having the structural formula:

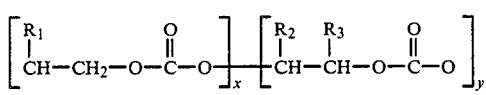

wherein $R_1$ is H, $CH_3$, $C_2H_5$ or $C_6H_5$; $R_2$ and $R_3$ are independently H, $CH_3$, $C_2H_5$ or $R_2$ and $R_3$ together form a six member ring; and x and y are both integers from 50 to 10,000.

19. The block copolymer in accordance with claim 18 wherein said copolymer has a molecular weight between 5,000 and 1,000,000.

20. The block copolymer in accordance with claim 18 wherein said copolymer is a thermoplastic elastomer.

21. The block copolymer in accordance with claim 18 wherein one covalently linked alkylene carbonate block comprises ethylene carbonate.

22. The block copolymer in accordance with claim 21 wherein the second covalently linked alkylene carbonate block comprises propylene carbonate.

23. The block copolymer in accordance with claim 21 wherein the second covalently linked alkylene carbonate block comprises cyclohexyl carbonate.

24. The block copolymer in accordance with claim 18 wherein the second covalently linked block is a "pure" polyalkylene carbonate block.

25. The block copolymer in accordance with claim 18 wherein the second covalently linked block is a "mixed" polyalkylene carbonate block.

* * * * *